United States Patent [19]

Yoshimura

[11] Patent Number: 4,991,546
[45] Date of Patent: Feb. 12, 1991

[54] COOLING DEVICE FOR BOAT ENGINE

[75] Inventor: Tsuyoshi Yoshimura, Hamamatsu, Japan

[73] Assignee: Sanshin Kogyo Kabushiki Kaisha, Hamamatsu, Japan

[21] Appl. No.: 374,282

[22] Filed: Jun. 30, 1989

[30] Foreign Application Priority Data

Jul. 5, 1988 [JP] Japan .............................. 63-165838

[51] Int. Cl.⁵ .............................................. F01P 7/16
[52] U.S. Cl. ............................ 123/41.31; 123/41.09; 60/321
[58] Field of Search ............... 123/41.31, 41.08, 41.09; 60/320, 321, 310; 440/89

[56] References Cited

U.S. PATENT DOCUMENTS

| | | | |
|---|---|---|---|
| 3,283,498 | 11/1966 | Connell | 60/321 |
| 3,780,712 | 12/1973 | Pace | 60/321 |
| 4,565,175 | 1/1986 | Kaye | 123/41.31 |
| 4,621,594 | 11/1986 | Kubis | 123/41.09 |
| 4,711,088 | 12/1987 | Berchem et al. | 60/321 |

Primary Examiner—Noah P. Kamen
Attorney, Agent, or Firm—Ernest A. Beutler

[57] ABSTRACT

A number of embodiments of cooling systems for internal combustion engines powering marine watercraft wherein the engine cooling jacket delivers its coolant to an exhaust manifold cooling jacket adjacent the inlet end of the exhaust manifold and wherein coolant is delivered from the exhaust manifold cooling jacket to a further cooling jacket around the inlet portion of an exhaust elbow. In one embodiment, a closed cooling system is provided for the engine cooling jacket, exhaust manifold cooling jacket and the elbow cooling jacket. In another embodiment, the system discharges coolant back to the body of water in which the watercraft is operating through a further cooling jacket of the exhaust elbow that communicates with its discharge end.

8 Claims, 6 Drawing Sheets

COOLING DEVICE FOR BOAT ENGINE

BACKGROUND OF THE INVENTION

This invention relates to a cooling device for a boat engine and more particularly to an improved system for cooling the engine exhaust manifold and exhaust elbow for a marine propulsion system.

As is well known, internal combustion engines are frequently employed for powering watercraft. It is the normal practice, particularly in connection with inboard engines, to provide the engine with a cooling jacket through which coolant is circulated for cooling the engine. In addition, the engine is provided with an exhaust manifold which also has a cooling jacket and which receives coolant from the engine for cooling the exhaust manifold. Exhaust gases are delivered from the exhaust manifold to an exhaust elbow wherein the exhaust gases are discharged to the atmosphere, generally through the body of water in which the watercraft is operating. It is further the common practice to employ a water jacket for the exhaust elbow and the coolant is received from the exhaust manifold, cools the exhaust elbow and then is discharged to the body of water in which the watercraft is operating along with the exhaust gases. Such systems provide a number of advantages. However, the circulation of the engine coolant through the exhaust manifold, particularly when the engine is operating at low temperatures, tends to cause cooling of the manifold and the condensation of liquid therein. The formation of liquid condensation in the interior of the exhaust elbow is particularly disadvantageous because of the possibility that water may be drawn back into the exhaust ports of the engine and damage the internal components of the engine. Arrangements have been provided wherein at least a portion of the coolant is circulated through only a portion of the exhaust elbow and then is returned to the cooling system for the engine before being returned to the body of water through the exhaust elbow. Although such arrangements tend to reduce the likelihood of condensation, they are nevertheless disadvantageous because condensation is still likely to occur, particularly when operating at low engine speeds and low temperatures.

Figure 1:
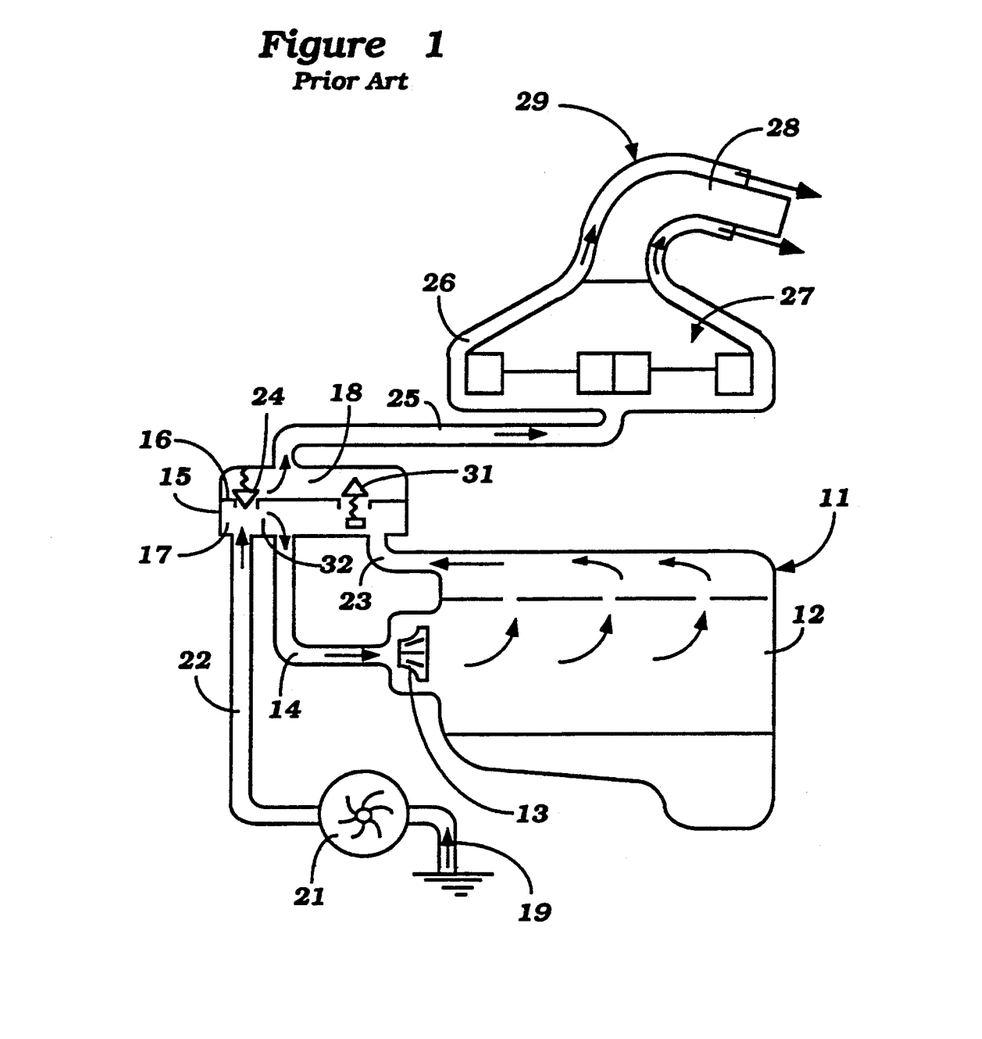
FIG. 1 is a partially schematic view of the cooling system for a marine engine constructed in accordance with one prior art type of arrangement.

FIG. 1 shows a conventional prior art marine engine cooling sysem and depicts the disadvantages of this type of arrangement. An engine 11 is provided with a cooling jacket 12 through which coolant is circulated by means of an engine driven cooling pump 13. The coolant pump 13 receives water through a conduit 14 from a tank 15 which is divided by an internal wall 16 into a lower chamber 17 and an upper chamber 18. Coolant is delivered from the body of water in which the watercraft is operating to the lower chamber 17 by means of an underwater pickup 19 and auxiliary pump 21 which delivers the coolant through a conduit 22 to the lower chamber 17.

As may be best seen in FIG. 1, the coolant pump 13 delivers water from the chamber 17 to an inlet of the cooling jacket 12 and the return coolant is delivered back to the chamber 17 through a return conduit 23.

A pressure responsive valve 24 is provided in the wall 16 for permitting the chambers 17 and 18 to communicate with each other and to establish a predetermined pressure in the cooling system. This coolant is returned to the body of water in which the watercraft is operating by means of a conduit 25 that extends to a cooling jacket 26 that is formed around an exhaust manifold 27 of the engine 11. The exhaust manifold 27 is shown spaced from the engine 11 but is obviously attached directly to it with its inlet openings in communication with the exhaust ports of the engine. The outlet end of the exhaust manifold 27 communicates with an exhaust elbow 28 via which water from the cooling system as thus far described is discharged to the body of water in which the watercraft is operating in a known manner. A cooling jacket 29 encircles the elbow 28 and receives coolant from the exhaust manifold jacket 26.

A temperature responsive thermostatic valve 31 communicates the chambers 17 and 18 with each other so as to permit the coolant to flow from the lower chamber 17 to the upper chamber 18 once the cooling jacket 12 reaches its normal operating temperature. When this occurs, the water will be discharged back to the body of water in which the watercraft is operating in the aforedescribed manner. It should also be noted that there is provided a restricted opening 32 between the inlet conduit 22 and the pump conduit 14 for restricting the amount of flow and hence the pressure responsive valve 24 will open when the thermostat 31 is closed so that coolant will continuously be circulated through the exhaust manifold 27 and elbow 28 even when the engine is at below its operating temperature. As a result, there is the likelihood of condensation forming in the elbow 28 which can give rise to the undesired results as aforedescribed.

Figure 2:
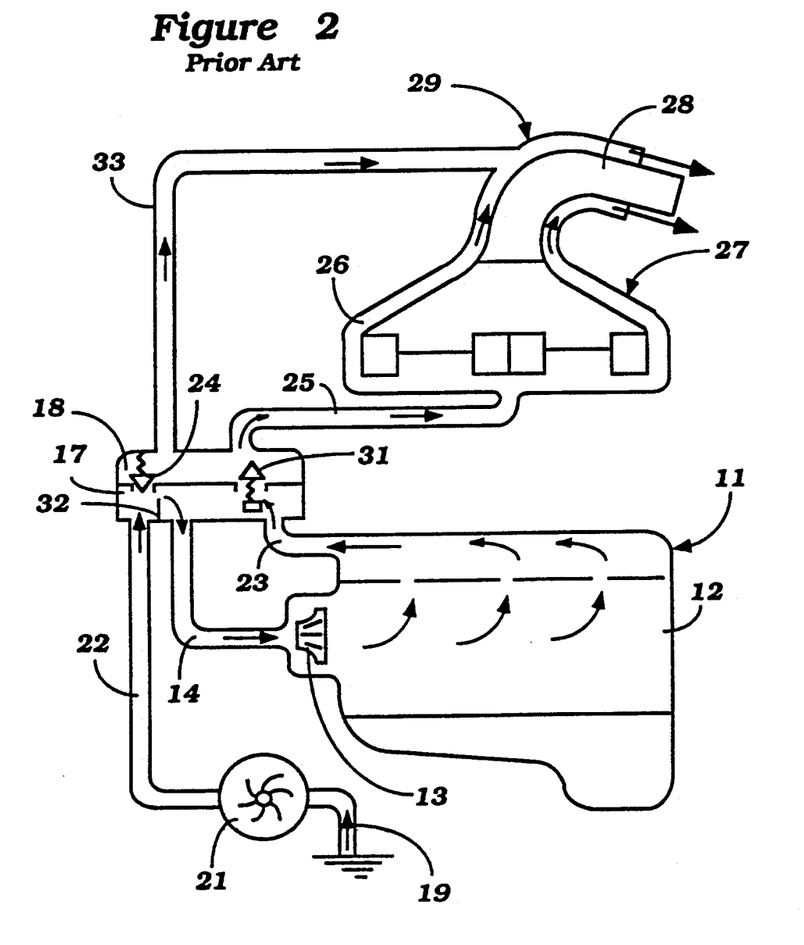
FIG. 2 is a partially schematic view, in part similar to FIG. 1, showing a second prior art construction.

FIG. 2 shows another prior art type of construction wherein an attempt is made to prevent the condensation problems as aforenoted. In connection with this construction, there is provided a further conduit 33 that extends from the chamber 18 to the elbow cooling jacket 29. In conjunction with this embodiment, the exhaust manifold cooling jacket 26 does not receive coolant at all times but the main coolant flow will be through the elbow cooling jacket 29 under low engine temperatures. However, the aforenoted problems still exist.

It is, therefore, a principal object of this invention to provide an improved cooling arrangement for a marine engine wherein the likelihood of condensation in the exhaust manifold and exhaust elbow is substantially reduced, if not completely eliminated.

It is a further object of this invention to provide an improved cooling system for a marine engine that will insure proper and adequate cooling of all components and yet which will also insure that condensation does not occur in the exhaust system, particularly when running at low engine speeds and low temperatures.

SUMMARY OF THE INVENTION

This invention is adapted to be embodied in a cooling system for a watercraft internal combustion engine which engine has a cooling jacket having an inlet and an outlet. An exhaust system is provided for the engine which is comprised of an exhaust manifold having an exhaust inlet end which communicates with an exhaust port of the engine and an exhaust discharge end for discharging exhaust gases to an exhaust inlet end of an exhaust elbow. The exhaust elbow has an exhaust outlet end for discharge exhaust gases to the atmosphere. The exhaust manifold is further provided with a cooling jacket having a coolant inlet in proximity to the exhaust inlet end and a coolant outlet spaced from the exhaust inlet end and in proximity to the exhaust discharge end. In accordance with the invention, means are provided for circulating coolant from the engine cooling jacket inlet to the engine cooling jacket outlet and thence to the exhaust manifold cooling jacket inlet and then to the exhaust manifold cooling jacket outlet. The water from the exhaust cooling jacket outlet is returned back to the cooling jacket inlet of the engine so as to recirculate coolant between the engine cooling jacket and the exhaust manifold in a direction to insure rapid heating of the coolant and to insure against excess quenching of the exhaust manifold.

In accordance with a further feature of the invention, there is additionally provided a cooling jacket around the exhaust elbow and this cooling jacket is also in communication with the recirculation path as aforenoted for additionally insuring heating of the elbow and avoid condensation therein.

DETAILED DESCRIPTION OF THE PREFERRED EMBODIMENTS

Figure 3:
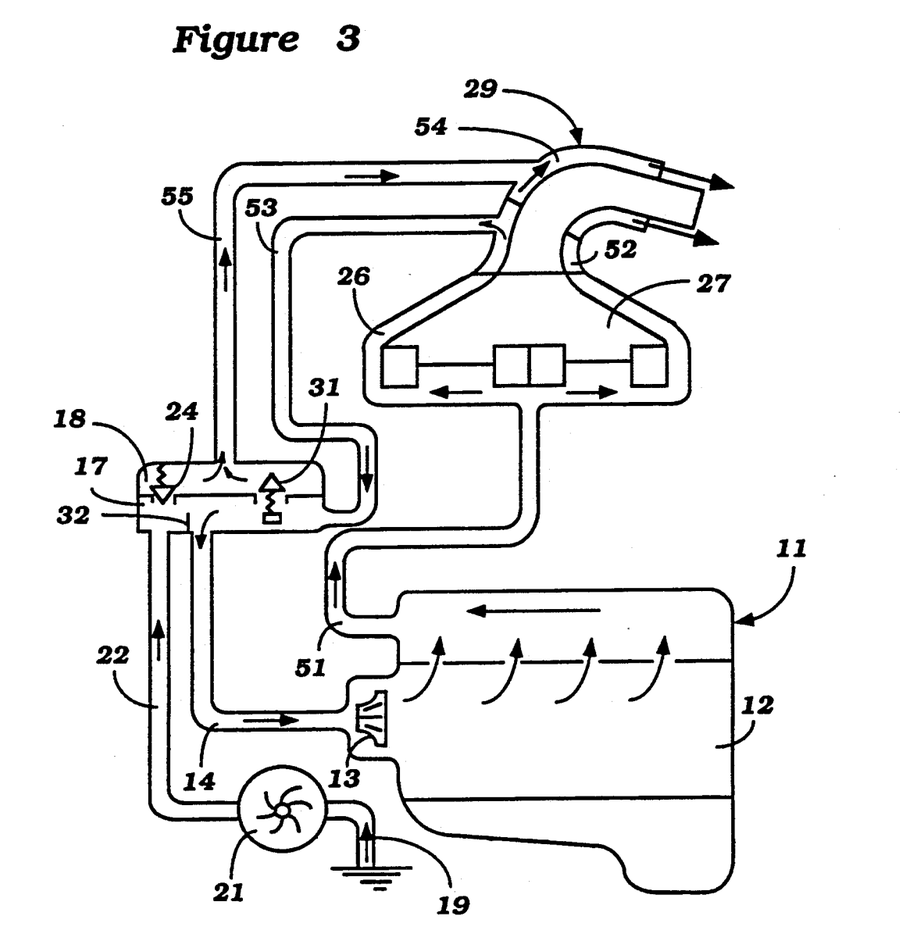
FIG. 3 is a schematic view, in part similar to FIGS. 1 and 2, showing the construction of a first embodiment of the invention.

Referring first to FIG. 3, a schematic view of an engine cooling system for a marine propulsion unit is depicted and the components of this embodiment which are the same as the previously described prior art constructions have been identified by the same reference numerals. However, in accordance with this embodiment, the circulation path is considerably different from the prior art constructions and, accordingly, the construction and operation of this device will be described in detail using some of the previously noted reference numerals and those which are particularly relevant to this embodiment.

It will be noted that in this embodiment, the inlet end of the exhaust manifold cooling jacket 26 is connected directly to the outlet of the engine cooling jacket 12 by means of a conduit 51. The conduit 51 communicates with the exhaust manifold cooling jacket inlet immediately adjacent the point where its exhaust inlet openings communicate with the exhaust ports of the engine. The coolant outlet opening of the exhaust manifold jacket 26 communicates with a first cooling jacket 52 of the elbow 29. This elbow cooling jacket 29 has a discharge opening that communicates back with the chamber 17 through a return conduit 53. As a result, it will be seen that at all times coolant circulates from the engine cooling jacket through the exhaust manifold cooling jacket 26 and the elbow cooling jacket 52. As a result, the elbow and exhaust manifold will be heated quickly upon engine running even at low temperatures and at low engine speed.

The exhaust elbow 29 is provided with a second cooling jacket 54 that encircles the discharge end of the elbow 29 and which receives coolant from the chamber 18 through a conduit 55. Coolant will flow through the conduit 55 to the jacket 54 and be discharged back to the body of water in which the watercraft is operating at all times but at a restricted rate. However, the recirculation of the coolant through the cooling jackets 26 and 52 will insure rapid heating of the manifold 27 and the inlet end of the elbow 29.

Figure 4:
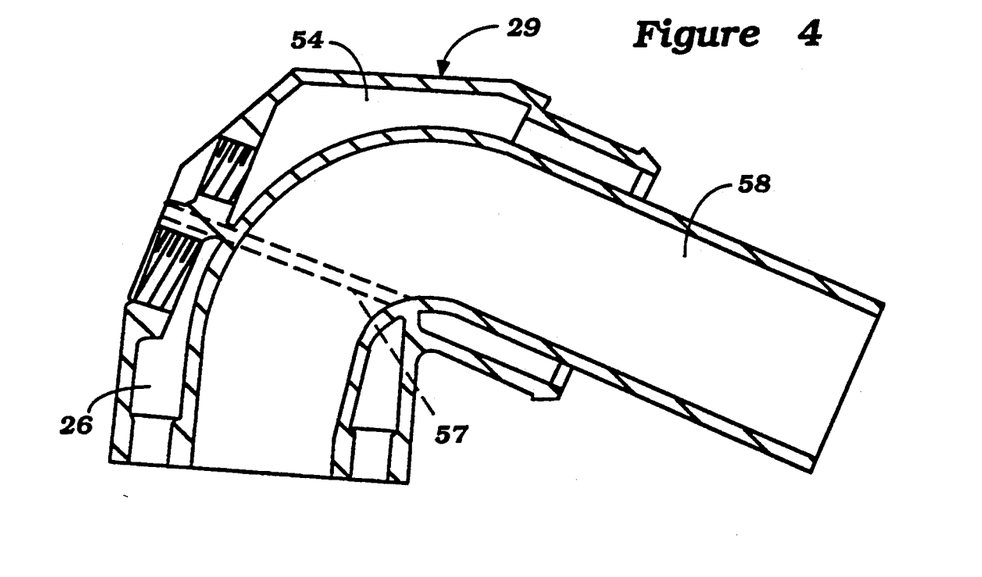
FIG. 4 is an enlarged cross-sectional view showing the construction of the cooling jacket for the exhaust elbow in this embodiment.
Figure 5:
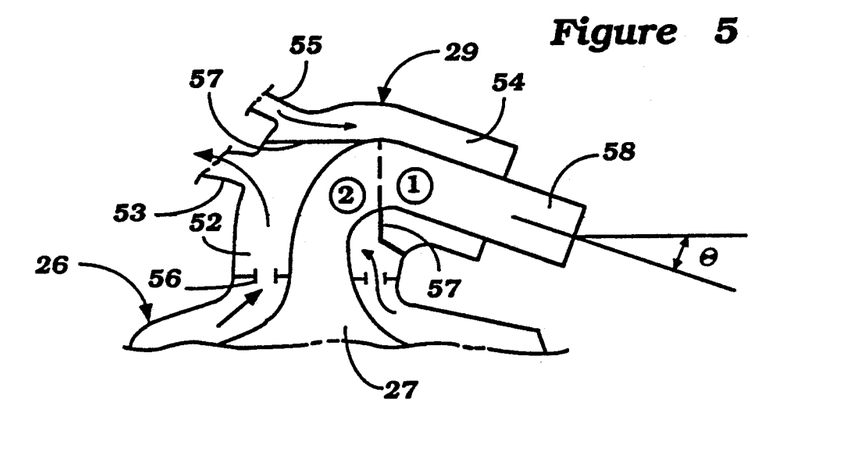
FIG. 5 is a schematic cross-sectional view showing the circulation paths through the exhaust elbow in this embodiment.

FIGS. 4 and 5 show the construction and detail of the exhaust elbow 29 and as may be readily seen, the exhaust manifold cooling jacket 26 has an outlet passage 56 that communicates directly with the inlet to the elbow cooling jacket 52. This cooling jacket 52 is isolated from the cooling jacket 54 by means of an internal wall 57. It will also be noted that the elbow 29 has a downwardly directed exhaust outlet portion 58 that is disposed at an angle $\theta$ to the horizontal so that any condensation which might occur in the portion 1 of the exhaust elbow will flow by gravity out of the exhaust system and rather than being returned back to the exhaust ports of the engine.

Figure 6:
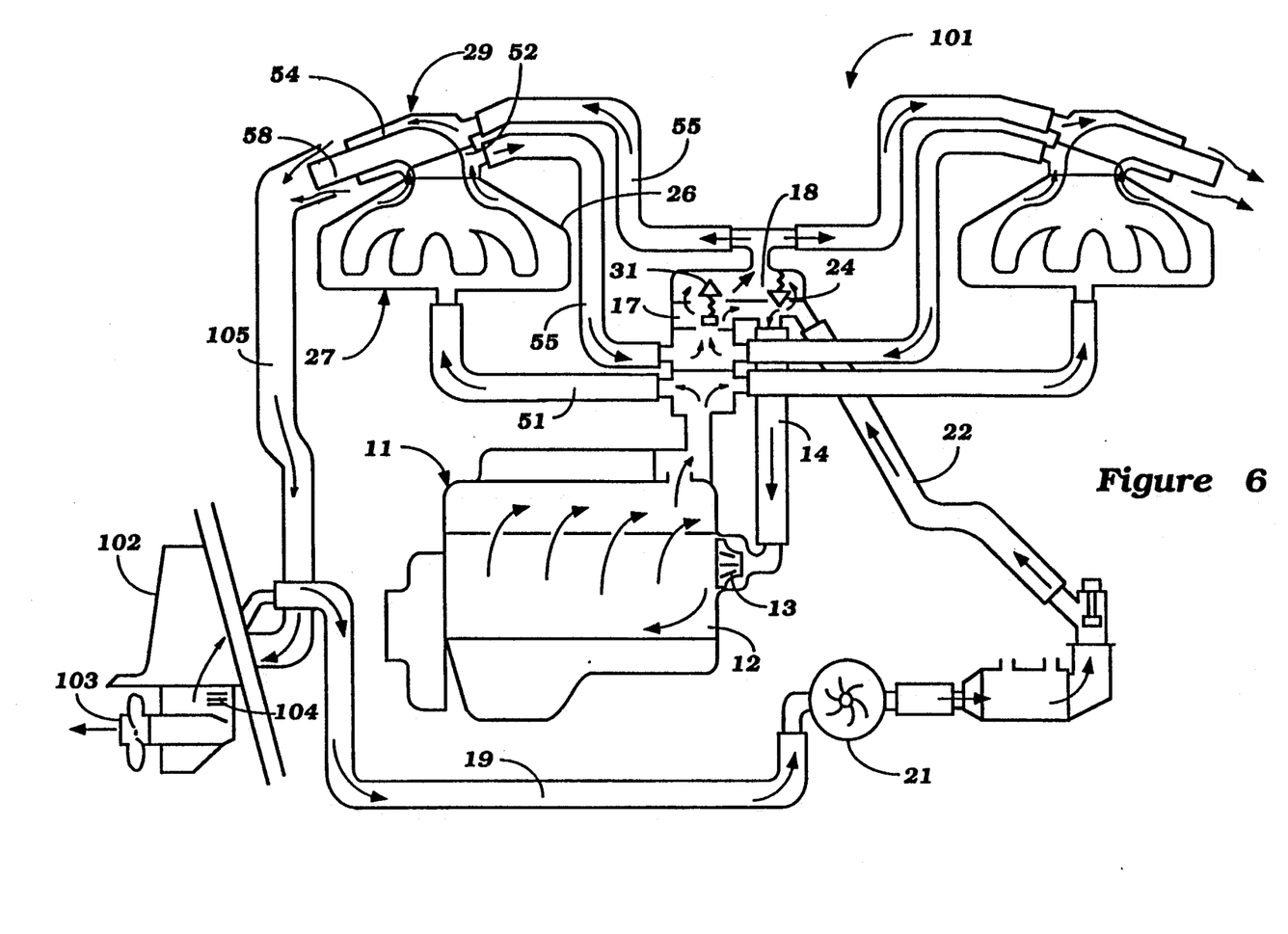
FIG. 6 is a further detailed schematic view showing the cooling system for a complete V-type engine and marine drive following the practices set forth in the embodiments of FIGS. 3 through 5.

FIG. 6 is a detailed schematic view showing the adaptation of the embodiment of FIGS. 3 through 5 in a full marine outboard drive, indicated generally by the reference numeral 101 and in which the engine 11 is provided for powering an outboard drive unit 102. The components which are the same as the schematic shown in FIGS. 3 through 5 have been identified by the same reference numerals and will not be described against in detail. Also, it should be noted that the engine 11 is depicted of as being of the V-type and, hence, is provided with two exhaust manifolds and two exhaust elbows. However, the adaptation of the invention to inline engines having only a single exhaust manifold should be readily apparent to those skilled in the art from FIGS. 3 through 5.

In this embodiment, the outboard drive unit 102 includes a propeller 103 that is driven by the output shaft of the engine 11 in a known manner. In addition the outboard drive unit 103 is provided with a water inlet 104 which communicates with the conduit 19 for delivery water to the auxiliary pump 21.

In this embodiment, the exhaust system for delivering the exhaust gases and coolant from the elbow cooling jacket 54 back to the body of water in which the watercraft is at least partially illustrated. It should be noted that there is provided a return conduit 105 that receives both exhaust gases from the elbow portion 59 and coolant from the jacket 54 to return it to the outboard drive unit 102. This coolant and exhaust gas flow is returned to the body of water in which the watercraft is operated in any known manner including a through the hub propeller exhaust in the propeller 103.

Figure 7:
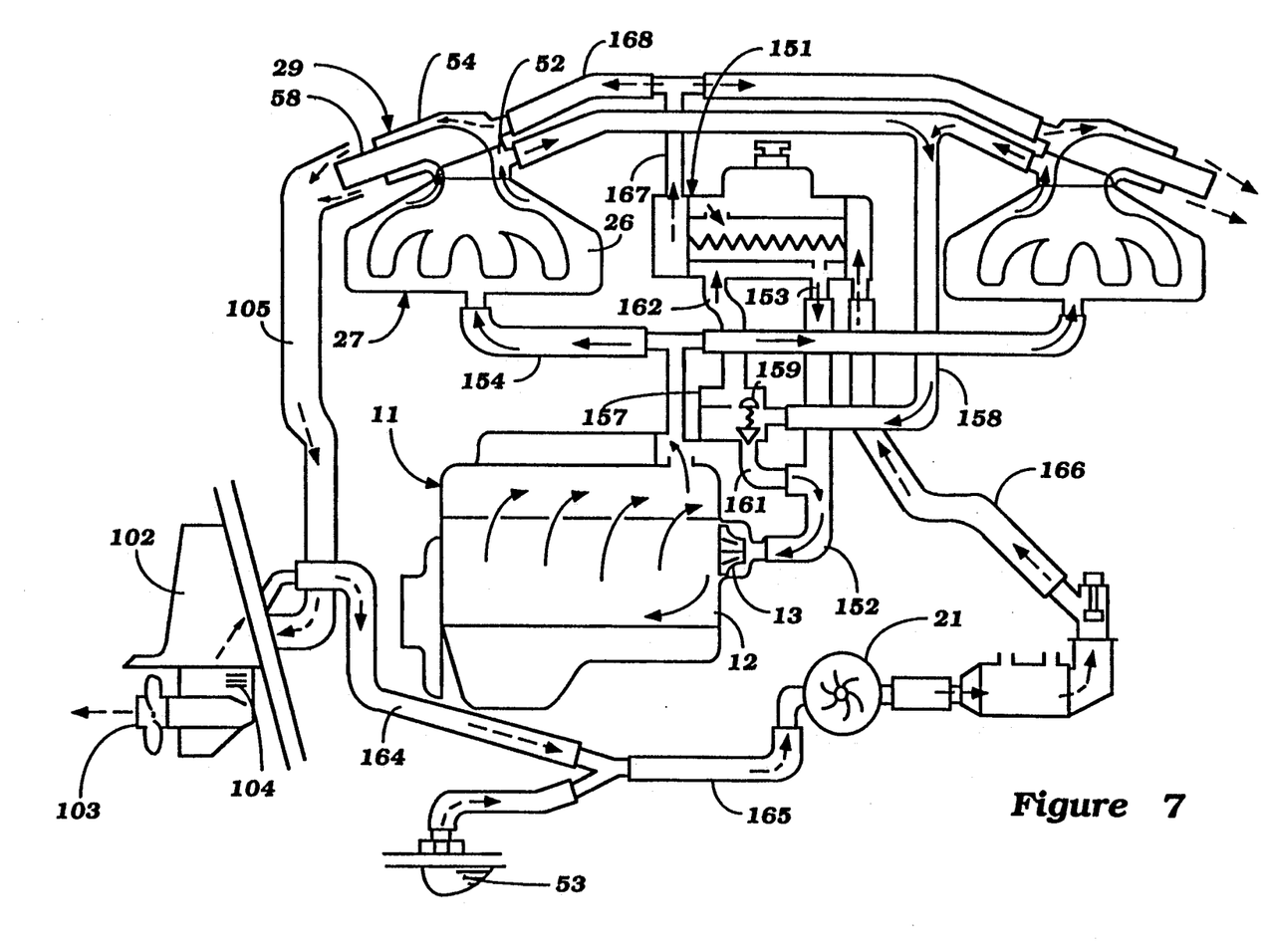
FIG. 7 is a schematic view, in part similar to FIG. 6, showing yet another embodiment of the invention.

FIG. 7 shows another embodiment of the invention which differs from the previously described embodiments in that the water for the cooling jacket of the engine and the cooling jacket of the exhaust manifolds 27 and the exhaust elbow portions 52 is continuously recirculated. In all previously described embodments, makeup water was added to these jackets and when the engine was at operating temperature, it was discharged from these jackets back to the body of water in which the watercraft was operating. FIG. 7 shows a closed cooling system for these water jackets that includes a radiator assembly, indicated generally by the reference numeral 151. The components of this embodiment which are the same as the embodiment of FIG. 6 have been identified by the same reference numerals and these components will not be described again in detail, except insofar as is necessary to understand the construction and operation of this embodiment.

In this embodiment, it will be noted that water is delivered to the water pump 13 by means of a conduit 152 that communicates with a discharge nozzle 153 of the radiator 151. The coolant which has been circulated through the engine cooling jacket 12 is returned to the exhaust manifold cooling jackets 26 through return conduits 154. This coolant is then circulated through the manifold cooling jackets 26 and then through the elbow cooling jackets 152 for return to a thermostat housing 157 by means of a return conduit 158. If the engine is at a low temperature, the thermostat 157 and specifically the thermostatic valve 159 thereof will cause the water to be returned to the engine cooling jacket directly through a bypass passageway 161 so that there will be substantially no coolant flow through the core of the radiator 101. However, when the engine coolant exceeds a predetermined temperature at which the thermostatic valve 159 opens, coolant will then be discharged back to the cooling jacket of the radiator 151 through a radiator inlet opening 162 for recirculation through the core of the radiator and back to the passageway 152 through the radiator outlet 153.

The water which has been drawn from the body of water in which the watercraft is operating through the inlet 104 or through an alternate through the bottom of the hull water inlet 163 will be delivered to the circulating pump 21 via conduits 164 and 165. This coolant is then delivered to a second jacket of the radiator 151 through a conduit 166 for contact with the jacket through which the coolant of the engine and exhaust manifold flows. This coolant is discharged from this portion of the radiator 151 through a discharge conduit 167 and conduits 168 to the cooling jackets 54 of the elbows 29. This coolant is continuously circulated back to the body of water in which the watercraft is operating and, hence, the aforenoted advantageous results of the previously described embodiment will be obtained. However, this embodiment has the additional advantage of providing a sealed cooling jacket for the engine, exhaust manifold and a portion of the exhaust elbow cooling jackets so that a coolant other than pure water may be employed if desired.

It should be readily apparent from the foregoing description that the embodiments of the invention illustrated and described are very effective in insuring an adequate cooling system for a marine propulsion unit and which prevents the likelihood of condensation in any part of the exhaust system which might return to the engine combustion chambers. Although a number of embodiments of the invention have been illustrated and described, various changes and modifications may be made without departing from the spirit and scope of the invention, as defined by the appended claims.

I claim:

1. In a cooling system for a watercraft internal combustion engine, said engine having a cooling jacket having an inlet and an outlet, an exhaust system for said engine comprises of an exhaust manifold having an exhaust inlet end communicating with an exhaust port of said engine and an exhaust discharge end for discharging exhaust gases to an exhaust inlet end of an exhaust elbow, said exhaust elbow having an exhaust outlet and for discharging exhaust gases to the atmosphere, said exhaust manifold further being provided with a cooling jacket having a coolant inlet in proximity to said exhaust inlet end and a coolant outlet spaced from said exhaust inlet end and in proximity to said exhaust discharge end, the improvement comprising means for circulating coolant only from said engine cooling jacket outlet to said exhaust manifold cooling jacket coolant inlet for delivering only heated coolant to said exhaust manifold cooling jacket, said exhaust elbow having a cooling jacket surrounding the inlet end of said exhaust elbow and having a coolant inlet and a coolant outlet, means for circulating coolant from said exhaust manifold cooling jacket coolant outlet to said first exhaust elbow cooling jacket coolant inlet and from said first exhaust elbow cooling jacket outlet, back to said engine cooling jacket inlet, and a further cooling jacket surrounding the discharge end of said exhaust elbow adapted to receive coolant and adapted to discharge the coolant into the exhaust gases discharged from said exhaust elbow.

2. In a cooling system as set forth in claim 1 wherein the engine cooling jacket, the exhaust manifold cooling jacket and the first mentioned exhaust elbow cooling jacket are all part of a closed coolant system further including a heat exchanger.

3. In a cooling system as set forth in claim 2 wherein the heat exchanger is cooled by coolant from the body of water in which the watercraft is operating and which water is discharged back to the body of water in which the watercraft is operating through the second mentioned exhaust elbow cooling jacket.

4. In a cooling system as set forth in claim 1 further including thermostatic valve means for selectively returning coolant from the first mentioned exhaust elbow cooling jacket back to the inlet for the engine cooling jacket or to the body of water in which the watercraft is operating through the second mentioned elbow cooling jacket.

5. In a closed cooling system as set forth in claim 1 wherein all of the coolant from the engine cooling jacket outlet is delivered to the exhaust manifold cooling jacket inlet.

6. In a closed cooling system for a watercraft internal combustion engine, said engine having a cooling jacket having an inlet and an outlet, an exhaust system for said engine comprised of an exhaust manifold having an exhaust inlet end communicating with an exhaust port of said engine and an exhaust discharge end for discharging exhaust gases to an exhaust inlet end of an exhaust elbow, said exhaust elbow having an exhaust outlet end for discharging exhaust gases to the atmosphere, said exhaust manifold further being provided with a cooling jacket having a coolant inlet in proximity to said exhaust inlet end and a coolant outlet spaced from said exhaust inlet end and in proximity to said exhaust discharge end, a first cooling jacket surrounding the inlet end of said exhaust elbow and having a coolant inlet in communication with said exhaust manifold coolant outlet and a coolant outlet in communication with said engine cooling jacket inlet, the improvement comprising means for circulating coolant from said engine cooling jacket outlet to said exhaust manifold cooling jacket coolant inlet, means for circulating coolant from said exhaust manifold cooling jacket coolant outlet to said first exhaust elbow coolant jacket inlet, means for circulating coolant from aid first exhaust elbow coolant jacket outlet back to said engine cooling jacket inlet, a heat exchanger, means for circulating coolant through said heat exchanger for maintaining said engine cooling jacket and said exhaust manifold cooling jacket at a desired temperature, and a further cooling jacket surrounding the discharge end of said exhaust elbow and adapted to discharge coolant into the exhaust gases discharged from said exhaust elbow.

7. In a closed cooling system as set forth in claim 6 wherein the heat exchanger is cooled by coolant from the body of water in which the watercraft is operating and which water is discharged back to the body of water in which the watercraft is operating through the second mentioned exhaust elbow cooling jacket.

8. In a cooling system for a watercraft internal combustion engine, said engine having a cooling jacket having an inlet and an outlet, an exhaust system for said engine comprises of an exhaust manifold having an exhaust inlet end communicating with an exhaust port of said engine and an exhaust discharge end for discharging exhaust gases to an exhaust inlet end of an exhaust elbow, said exhaust elbow having an exhaust outlet end for discharging exhaust gases to the atmosphere, said exhaust manifold further being provided with a cooling jacket having a coolant inlet in proximity to said exhaust inlet end and in proximity to said exhaust discharge end, means for circulating coolant from said engine cooling jacket outlet to said exhaust manifold cooling jacket coolant inlet, from said exhaust manifold cooling jacket coolant outlet back to said engine cooling jacket inlet, said cooling jacket surrounding at least a portion of said exhaust elbow, said exhaust elbow cooling jacket having a coolant inlet in communication with said exhaust manifold coolant outlet and a coolant outlet in communication with said engine cooling jacket inlet, a further cooling jacket surrounding the discharge end of said exhaust elbow and adapted to discharge coolant into the exhaust gases discharged from said exhaust elbow, and thermostatic valve means for selectively returning coolant from the first mentioned exhaust elbow cooling jacket back to the inlet from the engine cooling jacket or to the body of water in which the watercraft is operating through the second mentioned elbow cooling jacket.

* * * * *